United States Patent [19]

Shimizu

[11] 4,349,042

[45] Sep. 14, 1982

[54] FLUID SHUT-OFF DEVICE

[76] Inventor: Kunio Shimizu, 33-2, Asagaya-Minami 1-chome, Suginami-ku, Tokyo, Japan

[21] Appl. No.: 172,850

[22] Filed: Jul. 28, 1980

[51] Int. Cl.³ .............................................. F16K 17/36
[52] U.S. Cl. ................................... 137/39; 137/78.4; 137/460; 251/65
[58] Field of Search ............... 137/38, 39, 78.4, 460; 251/65

[56] References Cited

U.S. PATENT DOCUMENTS

| 2,405,127 | 8/1946 | Beach | 251/65 X |
| 3,212,751 | 10/1965 | Hassa | 251/65 |
| 3,467,135 | 9/1969 | Muskalla | 251/65 X |
| 3,951,378 | 4/1976 | Manor | 251/65 |
| 3,983,890 | 10/1976 | Rogers | 137/38 |
| 4,207,912 | 6/1980 | Ichikawa | 137/39 |

Primary Examiner—Robert G. Nilson
Attorney, Agent, or Firm—Wenderoth, Lind & Ponack

[57] ABSTRACT

A fluid shut-off device is provided which comprises a magnetic valve body provided in a non-magnetic hollow casing for movement between a first position to open a fluid passage and a second position on a valve seat to close the passage, and an annular permanent magnet provided outside the casing and urged toward the periphery of the valve seat by an elastic spring. The valve body is normally held in the first position but is allowed to move to the second position by the magnetic force of the permanent magnet at a predetermined condition.

6 Claims, 14 Drawing Figures

FLUID SHUT-OFF DEVICE

BACKGROUND OF THE INVENTION

This invention relates to a device for shutting off the flow of fluid, such as gaseous fuel, in case of emergency such as an earthquake or accidental leakage of explosive gas.

In the case of an earthquake or accidental leakage of explosive gaseous fuel, it is required to shut off the flow of the fuel from a supply pipe or tank without fail to avoid secondary accidents caused by explosion of the gaseous fuel. To this end, many fluid shut-off devices have been provided hitherto. However, most of them are complicated in structure, unreliable in operation or expensive in manufacturing cost.

Accordingly, an object of the present invention is to provide a fluid shut-off device which is very simple in structure, reliable in operation and inexpensive in manufacturing cost.

Another object of the present invention is to provide a fluid shut-off device which is operated by an earthquake and/or in connection with a detector for gas leakage.

A further object of the present invention is to provide a fluid shut-off device which can be reset very easily by one action from an operative shut-off position.

Still another object of the present invention is to provide a fluid shut-off device which is operated very accurately by a small supply of electric current and which can maintain the operated position without any further supply of electric current.

SUMMARY OF THE INVENTION

According to the present invention, a fluid shut-off device is provided which comprises a casing made of non-magnetic material, through which a fluid passage is formed for conneting with a fluid supply line. The casing also has therein a valve chamber in communication with the passage and valve seat between the passage and the valve chamber. A valve body made of magnetic substance is provided in the valve chamber for movement between a first position separated from the valve seat to open the passage and a second position on the valve seat to close the passage. Provided outside the casing is an annular permanent magnet, which is slidable thereon and urged toward the periphery of the valve seat by an elastic spring means. The valve body is held to the first position but is allowed to move to the second position by magnetic force of the permanant magnet at a predetermined condition.

Preferably, a first stopper is provided outside the casing near the periphery of the valve seat and the annular permanent magnet is normally pressed against the first stopper. The valve chamber has a second stopper therein which is separated from the valve seat by a space larger than the dimensions of the valve body. The valve body is urged against the second stopper by a spring member whereat the magnetic force of the permanent magnet is not strong enough to attract the valve body on the valve seat against the spring member. The valve body is made to be moved away from the second stopper toward the valve seat against the spring force of the spring member and attracted to the valve seat by the magnetic force of the permanent magnet when subjected to an earthquake having a predetermined magnitude.

More preferably, the fluid shut-off device comprises a solenoid provided at the periphery of the casing adjacent to the elastic spring means and a cylindrical magnetic core member provided at the interior of the valve chamber enclosed by the solenoid. The valve body is provided between the valve seat and the cylindrical core member and contacts the end of the cylindrical magnetic member at the inoperative position. It is arranged that when an electric current is supplied to the solenoid, the valve body is separated from the cylindrical magnetic member and moved to the valve seat by the magnetic force of the permanent magnet.

Other objects and features of the present invention will become apparent from the following detailed description of preferred embodiments of the present invention, when taken in conjunction with the accompanying drawings, in which:

BRIEF DESCRIPTION OF THE DRAWINGS

FIGS. 1(a) to 1(c) are sectional views showing a fluid shut-off device according to a first embodiment of the present invention, wherein FIG. 1(a) shows an inoperative position, FIG. 1(b) shows an operative position and FIG. 1(c) shows a resetting position, FIGS. 4(a) to 4(d) show a fluid shut-off device according to a fourth embodiment of the present invention, wherein FIG. 4(a) shows an inoperative position, FIG. 4(b) shows an operative position, FIG. 4(c) shows a resetting position, and FIG. 4(d) shows a sectional view taken along line D—D in FIG. 4(a).

FIGS. 5(a) to 5(d) show a fluid shut-off device according to a fifth embodiment of the present invention, wherein FIG. 5(a) shows an inoperative position, FIG. 5(b) shows an operative position, FIG. 5(c) shows a resetting position, FIG. 5(d) shows a resetting of a microswitch.

DETAILED DESCRIPTION OF THE INVENTION

Figure 1A:
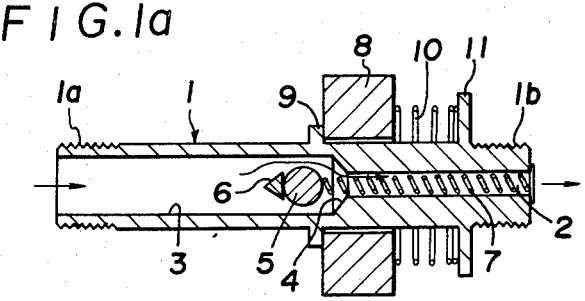
Figure 1B:
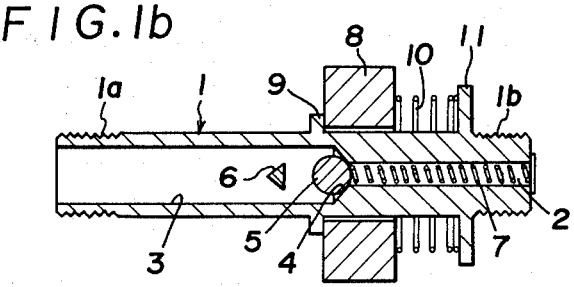
Figure 1C:
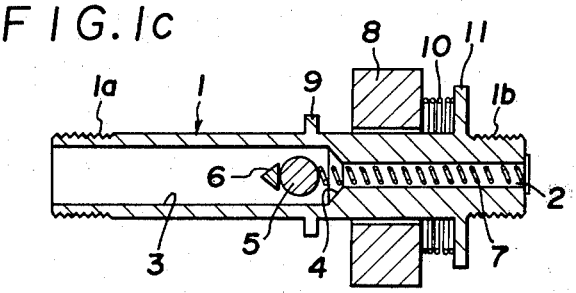

Referring to a first embodiment of the present invention, a fluid shut-off device of the present invention shown in FIGS. 1(a) to 1(c) is provided which comprises an elongated hollow casing 1 made of non-magnetic material. The casing 1 has end portions 1(a) and 1(b) adapted to be connected with hoses (not shown) for the supply of fluid such as gaseous fuel. The casing 1 also has a passage 2 and an enlarged valve chamber 3 therein in communication with a fluid supply line. Provided between the passage 2 and the valve chamber 3 is a valve seat 4 such as a frusto-conical valve seat for receiving a ball-shaped valve body 5 contained in the valve chamber 3. The valve body 5 is made of magnetic substance such as soft iron. The valve body 5 is lightly pressed against a stopper member 6 contained in the valve chamber 3 by a relatively weak compression spring 7, which extends through the passage 2. The stopper member 6 is separated from the valve seat 4 for a space larger than the diameter of the ball-shaped valve body 5, whereby when the valve body 5 is in contact with the stopper member as shown in FIG. 1(a), the valve seat 4 is open to allow free flow of the fluid through the valve chamber 3 and the passage 2.

Provided outside the casing 1 is an annular permanent magnet 8 which is slidable along the outer periphery of the casing. The permanent magnet 8 is urged against an annular stopper 9 by a coil spring 10 provided between an annular flange 11 on the casing and the permanent magnet 8. The annular stopper 9 is provided near the periphery of the valve seat 4 such that the annular permanent magnet encloses the valve seat at the position where the magnet 8 contacts the annular stopper 9.

The spring force of the relatively weak compression spring 7 in the passage 2 is arranged to allow the valve body 5 to move toward the valve seat 4 beyond a predetermined position when the present device is subjected to an earthquake of a predetermined magnitude. Also, the magnetic force of the permanent magnet is arranged such that when the valve body 5 is moved toward the valve seat beyond the predetermined position, the valve body is immediately attracted to the center portion of the annular permanent magnet, whereby the valve seat 4 of the valve chamber is closed by the valve body.

Now referring to the operation of the present device, FIG. 1(a) show an inoperative position wherein the annular permanent magnet is in contact with the annular stopper 9 and the ball-shaped valve body 5 is pressed against the stopper member 6 in the valve chamber 3. When the present device is subjected to an earthquake, the ball-shaped valve body 5 can move against the spring 7 in the passage 2. Then, in the event that the magnitude of the earthquake reaches a predetermined value, the valve body 5 moves toward the valve seat beyond a predetermined position. At this time, the magnetic force of the permanent magnet becomes higher than the spring force and, therefore, the valve body 5 is attracted to the center of the magnet and closes the valve seat, as shown in FIG. 1(b). At this operative position shown in FIG. 1(b), the valve body 5 remains on the valve seat and is maintained in such position closing the fluid passage by the magnetic force of the permanent magnet. When it is desired to reset the present device, the annular permanent magnet 8 is slid back against the coil spring 10, as shown in FIG. 1(c). By this sliding back of the magnet 8, the magnetic force applied to the valve body 5 on the valve seat 4 is remarkably reduced and the spring force of the spring 7 in the passage 2 becomes higher than the reduced magnetic force. Accordingly, the valve body is pressed against the stopper member 6 in the valve chamber 3 and takes the inoperative position. Thereafter, although the permanent magnet returns to the normal position shown in FIG. 1(a), the valve body cannot move at all from the inoperative position until the present device is subjected to a subsequent earthquake.

Figure 2:
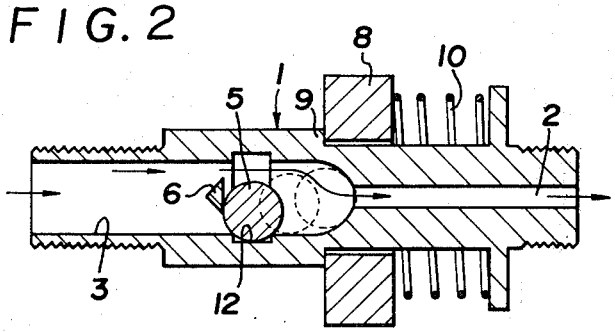
FIG. 2 is a sectional view showing a fluid shut-off device according to a second embodiment of the present invention, wherein solid lines show an inoperative position and dotted lines show an operated position.

Referring now to a second embodiment of the present invention shown in FIG. 2, a fluid shut-off device of this embodiment is also provided for shutting off fluid flow such as gaseous fuel by detecting an earthquake having a predetermined magnitude. In this second embodiment, in place of the relatively weak compression spring 7 in the first embodiment, a grooved recess 12 is formed in the valve chamber 3 for receiving a ball-shaped valve body 5 therein in an inoperative position. Other structures of the fluid shut-off device in the second embodiment are substantially the same as those of the first embodiment.

In operation, when the device is subjected to an earthquake having a predetermined magnitude, the ball-shaped valve body 5 rolls out of the grooved recess 12 toward the valve seat 4 and is attracted on the valve seat by the magnetic force of the annular permanent magnet 8, as shown by dotted lines in FIG. 2. On the other hand, when the permanent magnet 8 is slid back against the coil spring 10 for resetting of the device, since the magnetic force applied to the valve body 5 is greatly reduced, the valve body rolls down from the valve seat 4 by gravity and enters into the grooved recess 12. Other operational features of the device according to the second embodiment are the same as those of the first embodiment. Accordingly, any further detailed descriptions for the structure and operation of the device according to the second embodiment are omitted herein.

Figure 3:
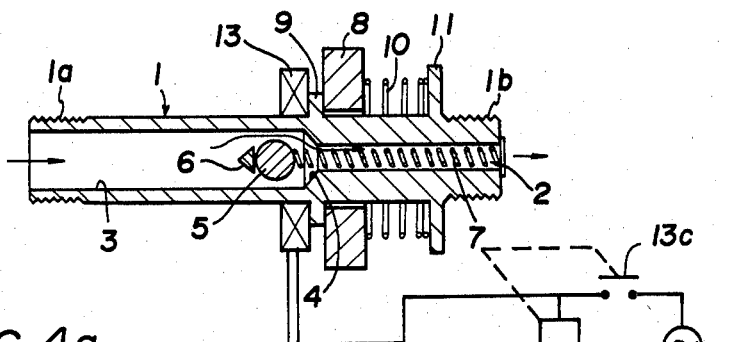
FIG. 3 is a sectional view showing fluid shut-off device in an inoperative position according to a third embodiment of the present invention.

Reference is now made to a third embodiment of the present invention shown in FIG. 3, in which a fluid shut-off device is provided so as to be operated by detecting an earthquake having a predetermined magnitude or by an electric current supplied from a detector for gas leakage or the like. The fluid shut-off device of this embodiment is a modified form of the first embodiment, so that the same reference numerals are applied to the same parts as the first embodiment.

In the device shown in FIG. 3, a solenoid 13 is provided at the periphery of the elongated casing 1 adjacent to the annular stopper 9 but opposite to the annular permanent magnet 8. This solenoid 13 is arranged in such a manner that the radial and axial central point of the solenoid is slightly separated from the center point of the ball-shaped valve body toward the valve seat 4. The solenoid 13 is connected to an electric source 13a through a detector 13b of gas leakage, which detector closes a switch 13c when it detects the leakage of gaseous fuel, and allows electric current to be supplied to the solenoid. This solenoid is also arranged so that when the electric current is supplied to the solenoid, a magnetic force sufficient to attract the valve body into the central point of the solenoid is generated. The permanent magnet 8 has such a magnetic force that it can attract the valve body 5 to the valve seat 4 against the force of the spring 7, when the valve body is attracted to the central point of the solenoid. Thus, in the event that the electric current is supplied to the solenoid from the gas leakage detector, the valve body moves to the central point of the solenoid against the force of the spring 7, where it is further attracted by the permanent magnet and closes the valve seat 4. Thereafter, the valve body 5 remains on the valve seat 4 by the magnetic force of the permanent magnet 8 even after the supply of the electric current to the solenoid is stopped. The reset of the valve body 5 to the inoperative position can be made by sliding back the permanent magnet as in the case of the first embodiment. Other structure and operation of the third embodiment shown in FIG. 3 are substantially the same as those of the first embodiment shown in FIG. 1(a) to FIG. 1(c). Thus, as will be understood from the disclosure set forth above, the fluid shut-off device of the third embodiment can be operated not only by an earthquake but also by the supply of electric current from a detector for gas leakage or the like.

Figure 4A:
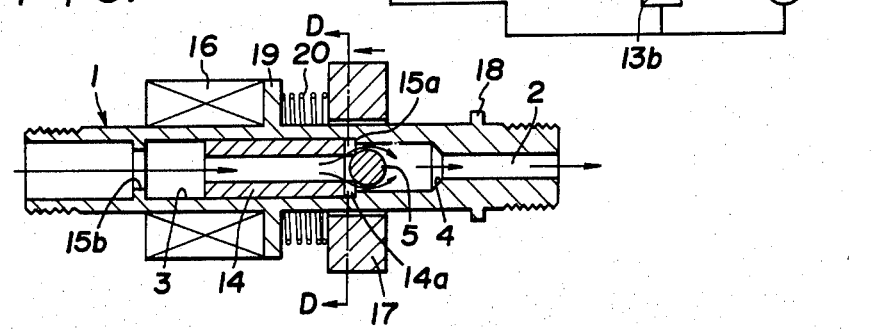
Figure 4B:
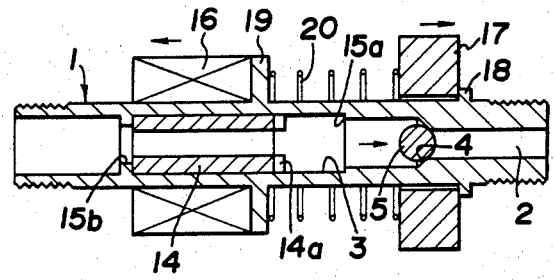
Figure 4D:
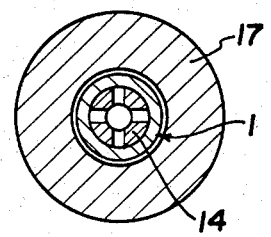

Reference is now made to a fourth embodiment of the present invention shown in FIG. 4(a) to FIG. 4(d). In this fourth embodiment, a cylindrical hollow core member 14 made of magnetic substance is provided in a valve chamber 3 separately from a ball-shaped valve body 5 in such a manner that the valve body 5 is positioned between a valve seat 4 and the core member 14. The core member 14 is formed to be slidable in the valve chamber 3 between a pair of stopper flanges 15(a) and 15(b) formed at the inner periphery of the valve chamber 3. One end of the core member 14 facing to the ball-shaped valve body 5 has a plurality of radial grooves 14(a) therein as shown in FIG. 4(d), so that when the valve body 5 contacts the end of the core member 14, radial spaces are formed therebetween to allow free flow of the fluid material. A solenoid 16 is provided at the outer periphery of the valve chamber 3 to partially enclose the core member 14 at the inoperative position shown in FIG. 4(a). This solenoid 16 is connected to an electric source through a detector (not shown) of the type set forth in the third embodiment. Thus, the solenoid 16 is actuated only when the detector is operated. Also provided at the outer periphery of the valve chamber 3 is an annular permanent magnet 17, which is slidable along the periphery of the casing 1 between annular flanges 18 and 19 thereon. A compression coil spring 20 is provided between the permanent magnet 17 and one of the flanges 19 which is adjacent to the solenoid 16. Thus, the permanent magnet 17 is urged toward the other flange 18 by the spring 20. The latter flange 18 functions as a stopper of the permanent magnet 17 and is provided near the periphery of the valve seat 4 such that when the annular permanent magnet 17 contacts the flange 18, the valve seat 4 is located at the center portion of the magnet 17.

Referring to the operation of the fluid shut-off device according to the fourth embodiment of the present invention, FIG. 4(a) shows an inoperative position of the device. At this inoperative position, the cylindrical core member 14 projects in the right-hand direction from the solenoid by the attraction force of the permanent magnet 17 and contacts the flanged stopper 15a at the inner periphery of the valve chamber 3. Also, the right-hand end of the core member 14 contacts the ball-shaped valve body 5. Furthermore, although the permanent magnet 17 is urged in the right-hand direction by the compression coil spring 20, the magnet stops moving at an intermediate position not reaching the flange stopper 18 due to the magnetic attraction force generated between the cylindrical core member 14 and the annular permanent magnet 17. In such an inoperative position, when an electric current is supplied to the solenoid through a detector of the type which detects leakage of gaseous fuel or the like, the cylindrical core member 14 is attracted in the left-hand direction in FIG. 4 due to the electromagnetic force generated by the actuation of the solenoid 16. It should be noted here that the solenoid 16 is formed to have an electromagnetic force high enough to attract the core member 14 into the solenoid against the magnetic attraction force of the permanent magnet 17. By the displacement of the core member 14 in the left-hand direction, the annular permanent magnet 17 cannot stay as it is any more and is moved until it abuts against the flange stopper 18 by the extension of the coil spring 20. By this movement of the permanent magnet, the ball-shaped valve body moves together with it and closes the valve seat 4 as shown in the operative position in FIG. 4(b). At this operative position, the valve body 5 is maintained on the valve seat 4 by the magnetic force of the permanent magnet 17 even after cutting off the supply of electric current to the solenoid 16.

Figure 4C:
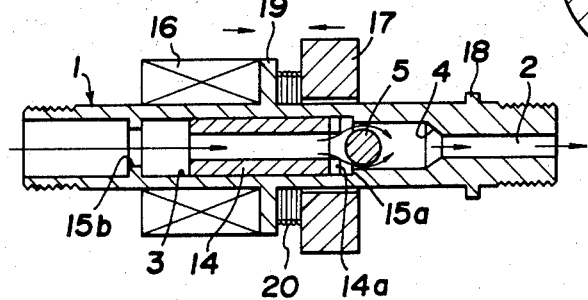

When it is desired to reset the present device into the inoperative position, the permanent magnet 17 is slid manually in the left-hand direction against the coil spring 20 until the magnet 17 closely approaches the flange 19, as shown in FIG. 4(c). At this time, the valve body 5 is moved in the same left-hand direction as it is magnetically attracted by the permanent magnet. Thereafter, when the leftward force on the permanent magnet is removed, the magnet 17 is moved in the right-hand direction by the force of the spring 20 and, at the same time, the cylindrical core member 14 is moved in the same direction as it is attracted by the magnetic force of the permanent magnet. At the position where the right-hand end of the core member 14 collides against the annular flange 15(a) in the valve chamber, the core member is restricted from moving further in the right-hand direction and the annular permanent magnet 17 stops moving as the magnetic attraction force between the magnet 17 and the core member 14 is balanced with the spring force of the coil spring 20.

Reference is now made to a fifth embodiment of the present invention shown in FIG. 5(a) to FIG. 5(e), in which the same reference numerals are adopted for the same parts as the previous embodiments set forth above. In this embodiment, a stationary cylindrical core member 21 is provided in a valve chamber 3. This core member 21 is enclosed by a solenoid 16 provided at the outer periphery of casing 1. Also provided at the outer periphery of the casing 1 around the valve seat 4 is an annular permanent magnet 17 which is urged in the right-hand direction by a compressed coil spring 20. At the inoperative position shown in FIG. 5(a), the permanent magnet 17 is pressed against a microswitch 22 by coil spring 20, which microswitch bears in turn against a flange stopper 18. This microswitch 22 is used for the reset of a detector of the type set forth above, through which an electric current is supplied to the solenoid 16. The microswitch 22 in FIG. 5(a) has already been reset to open the circuit in the detector at this inoperative position.

The fluid shut-off device according to this embodiment was provided on the basis of such fact that when a movable magnetic metal piece such as a ball-shaped valve body 5 in FIG. 4 is in contact with a stationary metal member, the movable metal piece cannot easily be separated from the stationary metal member and cannot be attracted to a permanent magnet even when the magnet approaches the movable metal piece closely up to a relatively short distance, and that when the movable metal piece is separated from the metal member for some reason at the above position closely approaching the magnet, the metal piece is immediately attracted to the magnet. Such fact can be explained in that the movable metal piece contacting the metal member is magnetized to a polarity opposite to that of the approached permanent magnet, so that by such magnetization of the metal piece, the movable metal piece can firmly attach the stationary metal member.

Figure 5A:
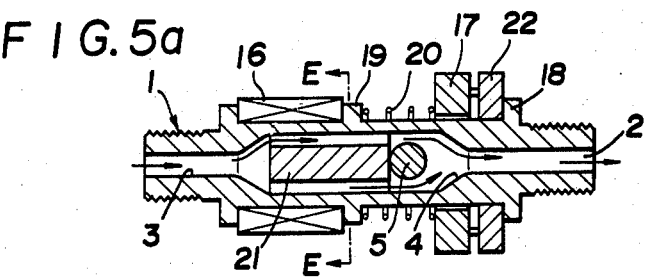
Figure 5B:
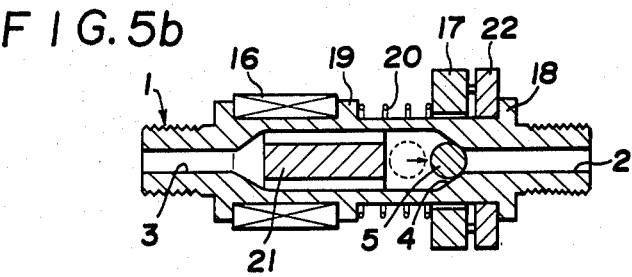

In view of the above facts, referring again to the device shown in FIG. 5(a), a ball-shaped valve body 5 made of soft iron is in contact with the stationary core member 21 at the inoperative position. At this position, since the distance between the valve body 5 and the permanent magnet 17 is very short, the valve body 5 is magnetized to a polarity opposite to that of the permanent magnet 17 and is magnetically attached to the core member 21. When a detector (not shown) of the type set forth above is actuated, an electric current is supplied to the solenoid 16 from an electric source through the detector, whereby the stationary core member 21 is magnetized to have a relatively high magnetic state. At the time when the core member 21 is magnetized to have the same polarity as the ball-shaped valve body 5 at the contact point therebetween, a repelling force is generated therebetween and the valve body 5 is separated from the stationary core member 21. At this instant, the valve body is attracted by the permanent magnet onto the valve seat 4 to close the flow of fluid material, as shown in FIG. 5(b). Preferably, the electric current supplied to the solenoid is direct current by which the core member 21 is magnetized to the same polarity as the valve body at the contact point therebetween. However, alternating current of relatively low frequency such as 50 Hz or 60 Hz supplied to city houses can be used for operating the present device as set forth above.

Once the valve body 5 takes the operative position shown by the solid line in FIG. 5(b), the valve body 5 remains on the valve seat 4 by the magnetic force of the permanent magnet even after the electric current to the solenoid is interrupted.

Figure 5C:
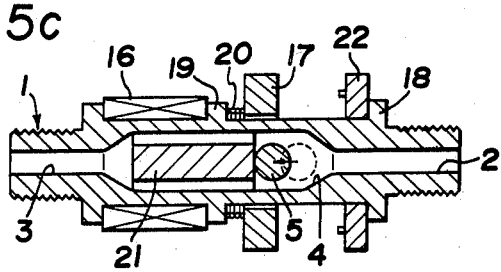
Figure 5D:
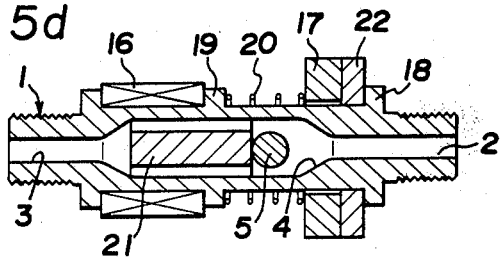
Figure 5E:
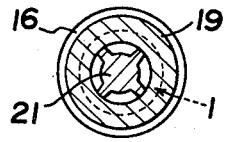
FIG. 5(e) shows a sectional view taken along line E—E in FIG. 5(a).

When it is desired to reset the device into the inoperative position, the annular permanent magnet 17 is slid along the casing 1 toward the solenoid. By such sliding movement of the magnet 17, the valve body 5 is also moved in the same direction by the magnetic attraction therebetween and comes to contact with the stationary core member 21, as shown in FIG. 5(c). Thereafter, the permanent magnet 17 is moved in the right-hand direction by the coil spring 20 until it contacts the microswitch 22. At the time of moving the permanent magnet 17 toward the microswitch 22 the valve body 5 is in contact with the core member 21 and cannot be separated therefrom due to magnetic force induced thereon by the permanent magnet, as set forth above. Then, the annular permanent magnet 17 is manually pressed against the microswitch 22 for reset so as to operate the switch and cut off the supply of electric current to the solenoid, as shown in FIG. 5(d).

The ball-shaped valve body 5 in the embodiment shown in FIG. 5(a) to FIG. 5(e) is made of a magnetic substance such as soft iron and is magnetized by magnetic induction from the annular permanent magnet 17. However, this valve body 5 can be a permanent magnet having a relatively low magnetic force. In this case the annular permanent magnet may not have such a high magnetic force as required in the above embodiment.

Although the present invention has been described with reference to preferred embodiments thereof, many modifications and alterations may be made within the spirit of the present invention.

What is claimed is:

1. A fluid shut-off device for use in a gas supply pipe to, during an emergency such as an earthquake, shut off the supply of gas through the pipe, said device comprising:

a horizontally positioned elongated casing formed of a non-magnetic material, said casing having therein a passage adapted to be connected to a horizontal section of a gas supply pipe, a valve chamber in communication with said passage, and a valve seat between said valve chamber and said passage;

a valve body formed of a magnetic material and positioned within said valve chamber for substantially horizontal movement between a first position spaced from said valve seat, to allow substantially unrestricted flow of gas from said valve chamber to said passage, and a second position contacting said valve seat, to shut off the flow of gas from said valve chamber to said passage;

first spring means positioned in said passage for urging said valve body to said first position thereof, said first spring means having a sufficiently weak spring force to enable said valve body, upon the occurrence of an earthquake, to vibrate and move toward said second position thereof;

an annular permanent magnet member surrounding the exterior of said casing and slidable thereon;

a stop member on the exterior of said casing at a location such that when said magnet member is adjacent said stop member, said magnet member is located at a position surrounding said passage and adjacent to said valve seat;

second spring means positioned normally for urging said magnet member toward said stop member to said position adjacent said valve seat; and said magnet member having a magnetic strength insufficient to move said valve body, when in said first position thereof, against said spring force of said first spring means to said second position thereof, but sufficient to move said valve body against said spring force of said first spring means to said second position thereof upon movement of said valve body, due to an earthquake, a predetermined distance against said spring force of said first spring means from said first position thereof toward said second position thereof.

2. A device as claimed in claim 1, further comprising a stopper in said valve chamber for defining said first position of said valve body.

3. A device as claimed in claim 1, wherein said valve body comprises a ball valve member.

4. A device as claimed in claim 1, further comprising means for, upon the occurrence of a gas leak in the gas line, moving said valve body by said predetermined distance from said first position thereof toward said second position thereof, and thereby for enabling said magnet member to move said valve body to said second position thereof.

5. A device as claimed in claim 4, wherein said means comprises a normally unactuated solenoid surrounding said casing at a location adjacent said magnet member, on the side of said magnet member opposite said second spring means, detector means for detecting a gas line leak, a current source, circuit means connecting said source to said solenoid upon the detection of a gas leak by said detector means, and thereby for causing said solenoid to generate a magnetic force sufficient to move said valve body by said predetermined distance.

6. A device as claimed in claim 5, wherein said solenoid is fixedly positioned axially of said casing.

* * * * *